(12) United States Patent
Hoch

(10) Patent No.: US 7,759,010 B2
(45) Date of Patent: Jul. 20, 2010

(54) PULSED COOLANT CONTROL FOR IMPROVED STACK COLD STARTING

(75) Inventor: Martin M. Hoch, Webster, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 1211 days.

(21) Appl. No.: 11/341,544

(22) Filed: Jan. 27, 2006

(65) Prior Publication Data
US 2007/0178342 A1 Aug. 2, 2007

(51) Int. Cl.
*H01M 8/04* (2006.01)
(52) U.S. Cl. .................... 429/437; 429/429; 429/434
(58) Field of Classification Search .............. None
See application file for complete search history.

(56) References Cited
U.S. PATENT DOCUMENTS

| | | | |
|---|---|---|---|
| 5,798,186 A | 8/1998 | Fletcher et al. | |
| 6,479,177 B1 | 11/2002 | Roberts et al. | |
| 6,764,781 B2 | 7/2004 | Hoch | |
| 6,773,840 B2 | 8/2004 | Couch et al. | |
| 2006/0234092 A1* | 10/2006 | Thompson et al. | 429/13 |
| 2006/0263651 A1* | 11/2006 | Fagley et al. | 429/13 |

FOREIGN PATENT DOCUMENTS

JP 2001-15140 * 1/2001

* cited by examiner

*Primary Examiner*—John S Maples

(57) ABSTRACT

A system and method for controlling the flow of a cooling fluid through a fuel cell stack during cold system start-up. A pump pumps the cooling fluid through the stack. At cold start-up, the pump is selectively turned on and off in a pulsed manner based on the temperature, cooling fluid volume, stack output power and other factors so that a minimal amount of the cold cooling fluid is introduced into the stack. By selectively controlling the duty cycle and the frequency of the pump pulsing, the reaction temperature will heat the cooling fluid, but the influence of the cold cooling fluid on the stack output power will be minimized. In an alternate embodiment, an electric heater is positioned in the inlet manifold, so that the cooling fluid is heated in the inlet manifold during the times that the pump is off.

19 Claims, 1 Drawing Sheet

PULSED COOLANT CONTROL FOR IMPROVED STACK COLD STARTING

BACKGROUND OF THE INVENTION

1. Field of the Invention

This invention relates generally to a system and method for providing a cooling fluid flow to a fuel cell stack at cold stack start-up and, more particularly, to a system and method for providing a cooling fluid flow to a fuel cell stack at cold stack start-up, where the method includes pulsing a pump that pumps the cooling fluid through the stack to limit the amount of cold cooling fluid that is provided to the stack.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode. The work acts to operate the vehicle.

Proton exchange membrane fuel cells (PEMFC) are a popular fuel cell for vehicles. The PEMFC generally includes a solid polymer-electrolyte proton-conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For the automotive fuel cell stack mentioned above, the stack may include two hundred or more fuel cells. The fuel cell stack receives a cathode reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack.

The fuel cell stack includes a series of flow field or bipolar plates positioned between the several MEAs in the stack. The bipolar plates include an anode side and a cathode side for adjacent fuel cells in the stack. Anode gas flow channels are provided on the anode side of the bipolar plates that allow the anode gas to flow to the anode side of the MEA. Cathode gas flow channels are provided on the cathode side of the bipolar plates that allow the cathode gas to flow to the cathode side of the MEA. The bipolar plates also include flow channels through which a cooling fluid flows.

Excessive stack temperatures may damage the membrane and other materials in the stack. Fuel cell systems therefore employ a thermal sub-system to control the temperature of the fuel cell stack. Particularly, a cooling fluid is pumped through the cooling fluid flow channels in the bipolar plates in the stack to draw away stack waste heat. During normal fuel cell stack operation, the speed of the pump is controlled based on the stack load, the ambient temperature and other factors, so that the operating temperature of the stack is maintained at an optimal temperature, for example 80° C. A radiator is typically provided in a coolant loop outside of the stack that cools the cooling fluid heated by the stack where the cooled cooling fluid is cycled back through the stack.

For normal temperature fuel cell system start-up, i.e., above O°, the cooling fluid pump is typically immediately started so that the stack components are not damaged as a result of the heat generated by the fuel cell reaction. However, if the cooling fluid in the coolant loop and stack is very cold at system start-up, and the pump is started, the cold cooling fluid has a quenching effect on the fuel cell reaction that causes the stack output voltage and power to significantly drop. Particularly, especially for high power start-up, the sub-zero temperature of the cooling fluid significantly reduces the ability of the stack to generate the desired power. This quenching effect may last for several seconds, and possibly tens of seconds depending on the pump speed and the cooling fluid volume.

It is known in the art to delay the start of the pump at cold system start-up until the stack is generating significant waste heat. However, eventually the cold cooling fluid will enter the stack when the pump is started, which will have the same quenching effect on the warm fuel cells. Further, the very cold cooling fluid flow at cold start-up may act to freeze the product water generated by the stack, which could block flow channels and cause other significant problems.

SUMMARY OF THE INVENTION

In accordance with the teachings of the present invention, a system and method for controlling the flow of a cooling fluid through a fuel cell stack at cold system start-up are disclosed. A pump pumps the cooling fluid into an inlet manifold in the fuel cell stack, through cooling fluid channels in the stack and out of the stack through an output manifold. At cold start-up, the pump is selectively turned on and off in a pulsed manner based on the temperature, cooling fluid volume, stack output power and other factors so that a minimal amount of the cold cooling fluid is introduced into the stack. By selectively controlling the duty cycle and the frequency of the pump pulsing, the temperature generated by the electro-chemical reaction will heat the cooling fluid, but the influence of the cold cooling fluid on the stack output power will be minimized. In one embodiment, the pump is pulsed on for a period of time so that just enough cooling fluid enters the stack to cover the active area of the fuel cells. In an alternate embodiment, an electric heater is positioned in the inlet manifold, so that the cooling fluid is heated in the inlet manifold during the times that the pump is off.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a fuel cell system that selectively controls the flow of cooling fluid to a fuel cell stack at cold start-up is merely exemplary in nature, and is in no way intended to limit the invention or its applications or uses.

Figure 1:
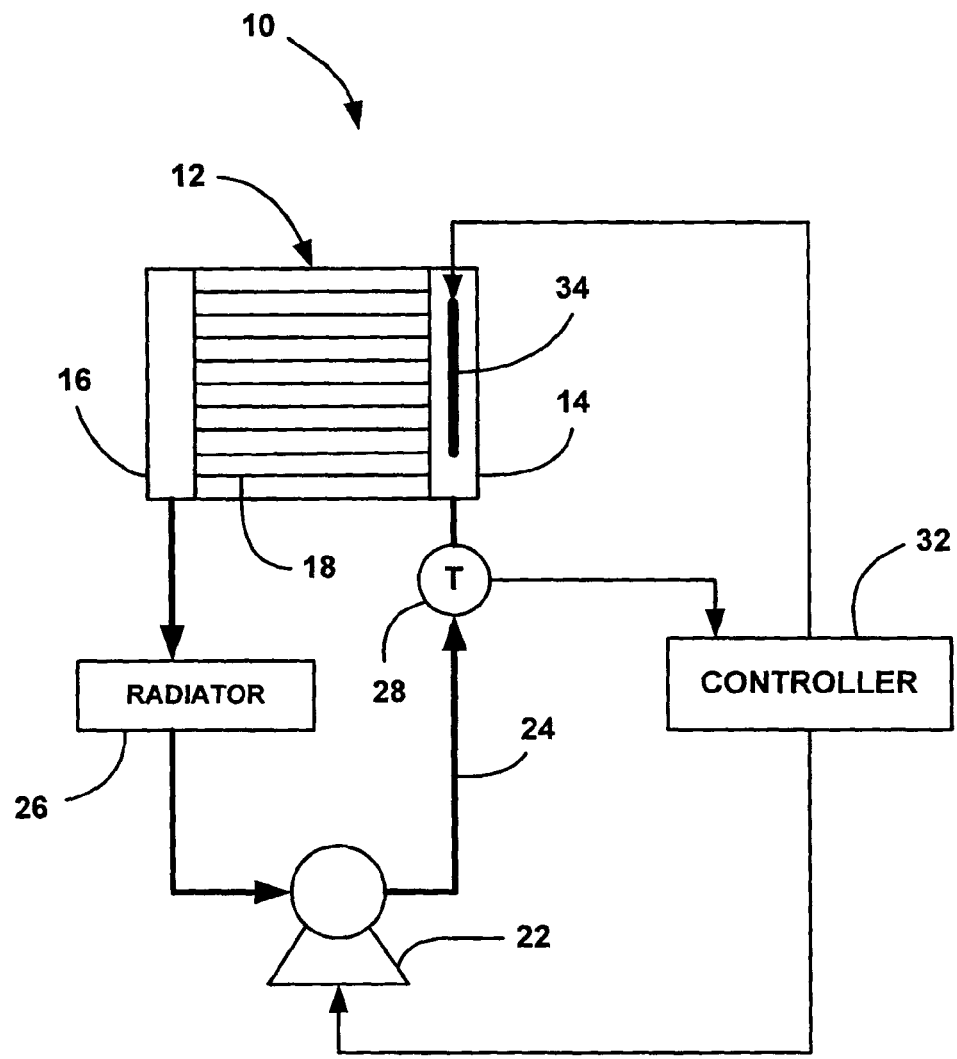
FIG. 1 is a schematic block diagram of a fuel cell system that selectively controls the flow of a cooling fluid to a fuel cell stack at cold start-up.

FIG. 1 is a schematic block diagram of a fuel cell system 10 including a fuel cell stack 12. The fuel cell stack 12 includes an inlet cooling fluid manifold 14, an outlet cooling fluid manifold 16 and cooling fluid flow channels 18 therebetween. A pump 22 pumps a cooling fluid through a coolant loop 24 outside of the stack 12, into the inlet manifold 14, through the flow channels 18, into the output manifold 16 and back to the coolant loop 24. The speed of the pump 22 is controlled by a controller 32 so that the operating temperature of the stack 12 is maintained at a desirable operating temperature, such as 80° C., during normal fuel cell stack operation. A radiator 26 receives the cooling fluid in the coolant loop 24 from the outlet manifold 16 and cools the cooling fluid before it is recycled back to the inlet manifold 14. The temperature of the cooling fluid in the coolant loop 24 is measured by a temperature sensor 28 that provides a temperature signal to the controller 32.

Figure 2:
FIG. 2 is a pulse signal for controlling the flow of the cooling fluid through the fuel cell stack in FIG. 1.

According to the invention, the controller 32 controls the on/off cycle of the pump 22 so that short bursts of the cooling fluid are injected into the inlet manifold 14 at cold system start-up. FIG. 2 shows a pulsed signal of the type that turns the pump 22 on and off at a desirable rate to provide this intermittent cooling fluid flow. Many variables go into determining the duty cycle and frequency of the pulsed signal to provide the desirable intermittent cooling fluid flow into the stack 12. In one embodiment, the pulse width of the signal is set so that the speed of the pump 22 causes slugs of the cooling fluid to flow through the cooling fluid channel 18 in an amount so that only the length of the active area of the fuel cells in stack 12 is displaced with new cooling fluid for each pulse. Therefore, the quenching effect of the super-cold cooling fluid at cold system start-up can be minimized by minimizing the amount of cold cooling fluid that is actually being introduced to the stack 12 at any given time. Further, the operation of electro-chemical reaction within the stack 12 causes the cooling fluid to heat up so that eventually the cooling fluid will reach a certain temperature, typically above 0° C., where a continuous flow of the cooling fluid through the coolant loop 24 can be provided by the pump 22. In one embodiment, the pump 22 is pulsed if the temperature of the cooling fluid is below 0° C. at system start-up.

The duty cycle and frequency of the pulsed signal is a function of the load on the stack 12, the volume of the cooling fluid, the ambient temperature and the temperature of the cooling fluid flowing through the coolant loop 24. As the cooling fluid is cycled through the coolant loop 24 and warmer cooling fluid is eventually introduced into the inlet manifold 14, the duty cycle and/or frequency of the pulsed signal can be increased until eventually the pump 22 will be continuously on, and the speed of the pump 22 will set the flow of the cooling fluid through the flow channels 18. In one embodiment, at cold start-up, the pump 22 may be on for 1-2 seconds and off for 5-10 seconds. During the pump off time, the fuel cells can quickly reheat themselves without being suppressed by a continuous flow of very cold cooling fluid. Therefore, pulsing the cooling fluid can minimize the stack voltage power drop associated with over cooling during cold-starts.

According to another embodiment of the present invention, a heater 34 is positioned in the inlet manifold 14. As mentioned above, some control schemes for thermal sub-systems of a fuel cell system delay the start up of the pump 22 at cold start-up to allow the stack 12 to reach its optimal operating temperature more quickly. During the time the pump 22 is off, power generated by the stack 12 can be used to power the heater 34, so that when the pump 22 is pulsed for the first shot of the cooling fluid into the flow channels 18, the temperature of the cooling fluid has been increased to minimize the effect of cold cooling fluid on the output power of the stack 12. As the pump 22 is being pulsed on and off based on the predetermined control scheme for the system 10, the heater 34 will be heating the cooling fluid in the inlet manifold 14 during each off pulse to provide further heating of the cooling fluid. Because, there is a relatively small volume of the cooling fluid in the inlet manifold 14, the cooling fluid will typically rapidly heat up to a desirable temperature. Also, the heater 34 can be a smaller heater, which would more effectively use the heating capacity of the reaction to raise the temperature of the stack 12 to its optimal operating temperature. In one embodiment, the heater 34 is an electric heater. However, as will be appreciated by those skilled in the art, other types of heaters, such as catalytic heaters, may also be applicable.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
   a fuel cell stack including an inlet cooling fluid manifold, an outlet cooling fluid manifold and cooling fluid flow channels therebetween;
   a pump for pumping a cooling fluid through a coolant loop outside of the fuel cell stack and through the inlet manifold, the outlet manifold and the cooling fluid flow channels; and
   a controller for controlling the operation of the pump based on predetermined variables, said controller intermittently turning the pump on and off to pump the cooling fluid through the fuel cell stack during a cold stack start-up operation, wherein the controller turns the pump on for 1-2 seconds and off for 5-10 seconds in a pulsed manner.

2. The system according to claim 1 wherein the predetermined variables include the volume of the cooling fluid, the stack output power and the temperature of the cooling fluid.

3. The system according to claim 1 wherein the controller controls the duty cycle and/or the frequency of the pump depending on the variables.

4. The system according to claim 1 further comprising a temperature sensor positioned within or proximate to the inlet manifold, said temperature sensor providing a temperature signal to the controller indicative of the temperature of the cooling fluid.

5. The system according to claim 1 further comprising a heater positioned within the inlet manifold, said controller turning on the heater to heat the cooling fluid during the cold start-up operation.

6. The system according to claim 5 wherein the heater is an electric heater.

7. The system according to claim 1 wherein the controller selects the on time of the pump so that the amount of cooling fluid sent through the flow channels is about equal to the amount of cooling that will only displace the cooling fluid relative to the active area of fuel cells in the stack.

8. The system according to claim 1 wherein the controller intermittently turns the pump on and off if the temperature of the cooling fluid is below 0° C.

9. The system according to claim 1 wherein the system is on a fuel cell vehicle.

10. A fuel cell system comprising:
- a fuel cell stack including an inlet cooling fluid manifold, an outlet cooling fluid manifold and cooling fluid flow channels therebetween;
- a pump for pumping a cooling fluid through a coolant loop outside of the fuel cell stack and through the inlet manifold, the outlet manifold and the cooling fluid flow channels;
- a temperature sensor positioned within or proximate to the inlet manifold, said temperature sensor providing a temperature signal indicative of the temperature of the cooling fluid;
- a heater positioned within the inlet manifold; and
- a controller for controlling the operation of the pump and the heater based on predetermined variables, said controller being responsive to the temperature signal, said controller intermittently turning the pump on and off to pump the cooling fluid through the fuel cell stack and turning the heater on during a cold stack start-up operation.

11. The system according to claim 10 wherein the predetermined variables include the volume of the cooling fluid, the stack output power and the temperature of the cooling fluid.

12. The system according to claim 10 wherein the controller controls the duty cycle and/or the frequency of the pump depending on the variables.

13. The system according to claim 10 wherein the heater is an electric heater.

14. The system according to claim 10 wherein the controller turns the pump on for 1-2 seconds and off for 5-10 seconds in a pulsed manner.

15. The system according to claim 10 wherein the controller selects the on time of the pump so that the amount of cooling fluid sent through the flow channels is about equal to the amount of cooling that will only displace the cooling fluid relative to the active area of fuel cells in the stack.

16. The system according to claim 10 wherein the controller intermittently turns the pump on and off if the temperature of the cooling fluid is below 0° C.

17. A fuel cell system comprising:
- a fuel cell stack including an inlet cooling fluid manifold, an outlet cooling fluid manifold and cooling fluid flow channels therebetween;
- a pump for pumping a cooling fluid through a coolant loop outside of the fuel cell stack and through the inlet manifold, the outlet manifold and the cooling fluid flow channels;
- a heater positioned within the inlet manifold; and
- a controller for controlling the operation of the pump by turning the pump on and off at cold stack start-up, said controller turning the heater on during a cold stack start-up operation.

18. The system according to claim 17 wherein the heater is an electric heater.

19. The system according to claim 17 wherein the controller turns the heater on if the temperature of the cooling fluid is below 0° C.

* * * * *